United States Patent
Shipley et al.

(10) Patent No.: US 9,473,286 B1
(45) Date of Patent: Oct. 18, 2016

(54) MANAGEMENT OF CARRIER-AGGREGATION BASED ON PREDICTED INTERMODULATION DISTORTION

(71) Applicant: Sprint Spectrum L.P., Overland Park, KS (US)

(72) Inventors: Trevor D. Shipley, Olathe, KS (US); John J. Humbert, Overland Park, KS (US); Craig A. Sparks, Overland Park, KS (US); Nick J. Baustert, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 65 days.

(21) Appl. No.: 14/556,724

(22) Filed: Dec. 1, 2014

(51) Int. Cl.
*H04W 72/04* (2009.01)
*H04L 5/00* (2006.01)
*H04W 72/08* (2009.01)

(52) U.S. Cl.
CPC ........... *H04L 5/0062* (2013.01); *H04L 5/0085* (2013.01); *H04W 72/085* (2013.01)

(58) Field of Classification Search
CPC .. H04L 5/0062; H04L 5/0085; H04W 52/04; H04W 52/14; H04W 52/143; H04W 52/146; H04W 52/16; H04W 52/24; H04W 52/241; H04W 52/242; H04W 52/243; H04W 72/085; H04W 72/04; H04W 72/0406; H04W 72/0413; H04W 72/042
See application file for complete search history.

(56) References Cited

U.S. PATENT DOCUMENTS

| | | | |
|---|---|---|---|
| 2008/0043677 A1* | 2/2008 | Kim ..................... | H04B 7/0417 370/332 |
| 2008/0188184 A1* | 8/2008 | Nogami ................ | H04L 1/0003 455/67.11 |
| 2012/0088455 A1 | 4/2012 | Love et al. | |
| 2012/0213095 A1* | 8/2012 | Krishnamurthy ....... | H04L 5/001 370/252 |
| 2012/0320769 A1* | 12/2012 | Callender ............... | H04L 5/001 370/252 |
| 2013/0194938 A1* | 8/2013 | Immonen ............... | H04B 1/525 370/252 |
| 2013/0315085 A1* | 11/2013 | Krishnamurthy ....... | H04L 5/001 370/252 |
| 2015/0141068 A1* | 5/2015 | Immonen ............... | H04L 5/001 455/522 |
| 2015/0341945 A1* | 11/2015 | Panchal ................. | H04L 5/003 370/329 |

* cited by examiner

*Primary Examiner* — Candal Elpenord (57) ABSTRACT

A method and corresponding system to help manage carrier-aggregation service in view of possible intermodulation distortion between component carriers. When a base station is serving a UE with carrier aggregation service on at least two component carriers, the base station determines that uplink communication on the two component carriers is likely to combine to produce an intermodulation product that falls within the downlink channel of one of the component carriers, and that the power level of that intermodulation product is likely to be threshold high. In response, the base station then modifies the set of component carriers on which the base station provides the UE with carrier aggregation service, to help reduce or avoid associated intermodulation distortion.

22 Claims, 7 Drawing Sheets

| CQI | 64 QAM | 16 QAM | QPSK |
|---|---|---|---|
| 0 | 23 dB | 23 dB | 23 dB |
| 1 | 23 dB | 23 dB | 23 dB |
| 2 | 23 dB | 23 dB | 20 dB |
| 3 | 23 dB | 23 dB | 17 dB |
| 4 | 23 dB | 23 dB | 14 dB |
| 5 | 23 dB | 23 dB | 11 dB |
| 6 | 23 dB | 23 dB | 8 dB |
| 7 | 23 dB | 23 dB | 5 dB |
| 8 | 23 dB | 20 dB | 2 dB |
| 9 | 23 dB | 17 dB | 1 dB |
| 10 | 23 dB | 14 dB | 0 dB |
| 11 | 20 dB | 11 dB | -1 dB |
| 12 | 14 dB | 7 dB | -2 dB |
| 13 | 11 dB | 3 dB | -3 dB |
| 14 | 5 dB | 0 dB | -4 dB |
| 15 | 0 dB | -3 dB | -5 dB |

MANAGEMENT OF CARRIER-AGGREGATION BASED ON PREDICTED INTERMODULATION DISTORTION

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective downlink frequency range or "downlink channel" for carrying communications from the base station to UEs and a respective uplink frequency range or "uplink channel" for carrying communications from UEs to the base station. Further, both the downlink channel and uplink channel of each carrier may be divided into sub-channels for carrying particular communications, such as one or more control channels for carrying control signaling and one or more traffic channels for carrying application-layer data and other traffic.

In general, when a UE is positioned within coverage of a base station, the base station may serve the UE on a particular carrier and may allocate resources on that carrier for use to carry communications to and from the UE.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are divided over the bandwidth of the carrier into sub-carriers that are grouped within each slot into resource blocks. When a UE is positioned within coverage of a base station in such a system, the UE may register or "attach" with the base station, and the base station may then schedule particular downlink and uplink resource blocks on the air interface to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

With such an arrangement, the bandwidth of the carrier on which the base station serves a UE may define an effective limit on the rate of data communication between the base station and the UE, as the bandwidth would define only a limited number of resource blocks per slot, with data rate per resource block being further limited based on air interface conditions. By way of example, in accordance with the LTE standard, the uplink and downlink channels on each carrier may be 3 MHz, 5 MHz, 10 MHz, 15 MHz, or 20 MHz, each resource block spans 180 kHz, and each slot is 0.5 milliseconds long. Accounting for guard bands at the edges of each carrier, the maximum number of resource blocks per 0.5 millisecond slot is thus 15 in 3 MHz, 25 in 5 MHz, 50 in 10 MHz, 75 in 15 MHz, and 100 in 10 MHz. Consequently, an LTE base station that serves UEs on such a carrier would have only the specified number of resource blocks available to allocate for air interface communication per slot, with coding rate in each resource block being further limited based on air interface conditions.

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater number of resource blocks in which the base station can schedule uplink and downlink communication. Further, where the concurrently-used component carriers are sufficiently distant from each other in the frequency spectrum, serving a UE concurrently on those component carriers may additionally create a frequency-diversity effect that could further improve data throughput.

Overview

One issue that can arise when a UE is being served with carrier aggregation service on a set of component carriers is that the UE's uplink transmission concurrently on at least two of those component carriers could combine to produce an intermodulation frequency product that may interfere with the UE's downlink communication on one of the component carriers. In general, certain pairs of frequencies may combine to produce various such intermodulation products, such as third order intermodulation products for instance, which could create such interference or distortion. Consequently, it may be desirable to ensure that a base station does not serve a UE with carrier aggregation service using such a pair of frequencies.

In practice, given engineering analysis that establishes that certain pairs of carriers would combine to produce intermodulation distortion, a wireless service provider may configure its base stations to altogether avoid providing carrier aggregation service using such pairs of carriers. It turns out, however, that such a restriction would be over-broad—as it is not necessarily the case that a pair of carriers that would combine to produce intermodulation distortion would in fact produce so much intermodulation distortion as to be problematic. In practice, the extent of intermodulation distortion may depend on the power level at which the UE transmits on the two carriers, and the impact of the intermodulation distortion may depend on how intermodulation power level compares with the power level at which the UE is receiving downlink communications.

Disclosed herein is a method and corresponding system to help better manage carrier-aggregation service in view of possible intermodulation distortion between carriers used concurrently. In accordance with the disclosure, when a base station is serving a UE with carrier aggregation service on at least two component carriers, the base station may determine that the UE's uplink communication on the two component carriers is likely to combine to produce an intermodulation product that falls within the downlink channel of one of the component carriers, and that the power level of that intermodulation product is likely to be threshold high in comparison with the UE's receive power level on that downlink channel. In response, the base station may then modify the set of component carriers on which the base station provides the UE with carrier aggregation service—such as by switching another component carrier in place of one of the two, or altogether switching to use a different pair of component carriers, preferably one that would not present an intermodulation distortion issue.

As such, the disclosed method and system may help to more intelligently manage allocation of carriers for carrier-aggregation service, avoiding overbroad elimination of certain pairs of carriers, by taking into account actual conditions and operational states as a basis to determine whether to transition from use of one set of component carriers to use of a different set of component carriers.

Accordingly, in one respect, disclosed is a method operable by a base station, such as an LTE base station (e.g., evolved Node-B (eNodeB)) for instance. According to the method, the base station serves a UE with carrier-aggregation service on a set of component carriers including a first component carrier and a second component carrier (e.g., having directed the UE to operates on those component carriers and being set to schedule communications with the UE concurrently on those component carriers). While so serving the UE, the base station then predicts that transmission by the UE concurrently on an uplink channel of the first component carrier and on an uplink channel of the second component carrier is likely to produce an intermodulation product that falls within a downlink channel of either the first component carrier or the second component carrier and that the intermodulation product is likely to be threshold strong in relation to a receive power of the UE on the downlink channel. In response to making that prediction, the base station then transitions from serving the UE with carrier-aggregation service on the set of component carriers to serving the UE with carrier-aggregation service on a different set of component carriers.

In another respect, disclosed is a method of managing component carriers on which a base station serves a UE with carrier-aggregation service, with the method starting in a scenario where the base station is serving the UE on a set of component carriers comprising a first component carrier and a second component carrier. In line with the discussion above, each such component carrier would have a respective uplink frequency channel and a different respective downlink frequency channel. In that context, the method then involves the base station making a first determination that an intermodulation product of the uplink frequency channel of the first component carrier and the uplink frequency channel of the second component carrier falls within the downlink frequency channel of the first component carrier. Further, the method involves, responsive to the first determination, the base station (i) predicting a power level $P_{IM}$ of the intermodulation product, and (ii) making a second determination that the predicted power level $P_{IM}$ of the intermodulation product is threshold high. And the method then involves, responsive to the second determination, changing the set of component carriers on which the base station serves the UE with carrier-aggregation service, to help avoid producing the intermodulation product.

Still further, in another respect, disclosed is an LTE eNodeB that is configured to serve UEs with carrier-aggregation service over an air interface. As disclosed, the eNodeB includes an antenna structure for transmitting and receiving over the air interface, and a controller for managing communication over the air interface, including managing assignment of component carriers on which to serve UEs with carrier-aggregation service. In particular, the controller is configured to predict, when the eNodeB is serving a UE with carrier-aggregation service on a set of component carriers including a first component carrier and a second component carrier, that transmission by the UE concurrently on an uplink channel of the first component carrier and on an uplink channel of the second component carrier is likely to produce an intermodulation product that falls within a downlink channel of either the first component carrier or the second component carrier and that the intermodulation product is likely to be threshold strong in relation to a receive power of the UE on the downlink channel. And the controller is configured to respond to that prediction by transitioning the eNodeB from serving the UE with carrier-aggregation service on the set of component carriers to serving the UE with carrier-aggregation service on a different set of component carriers.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
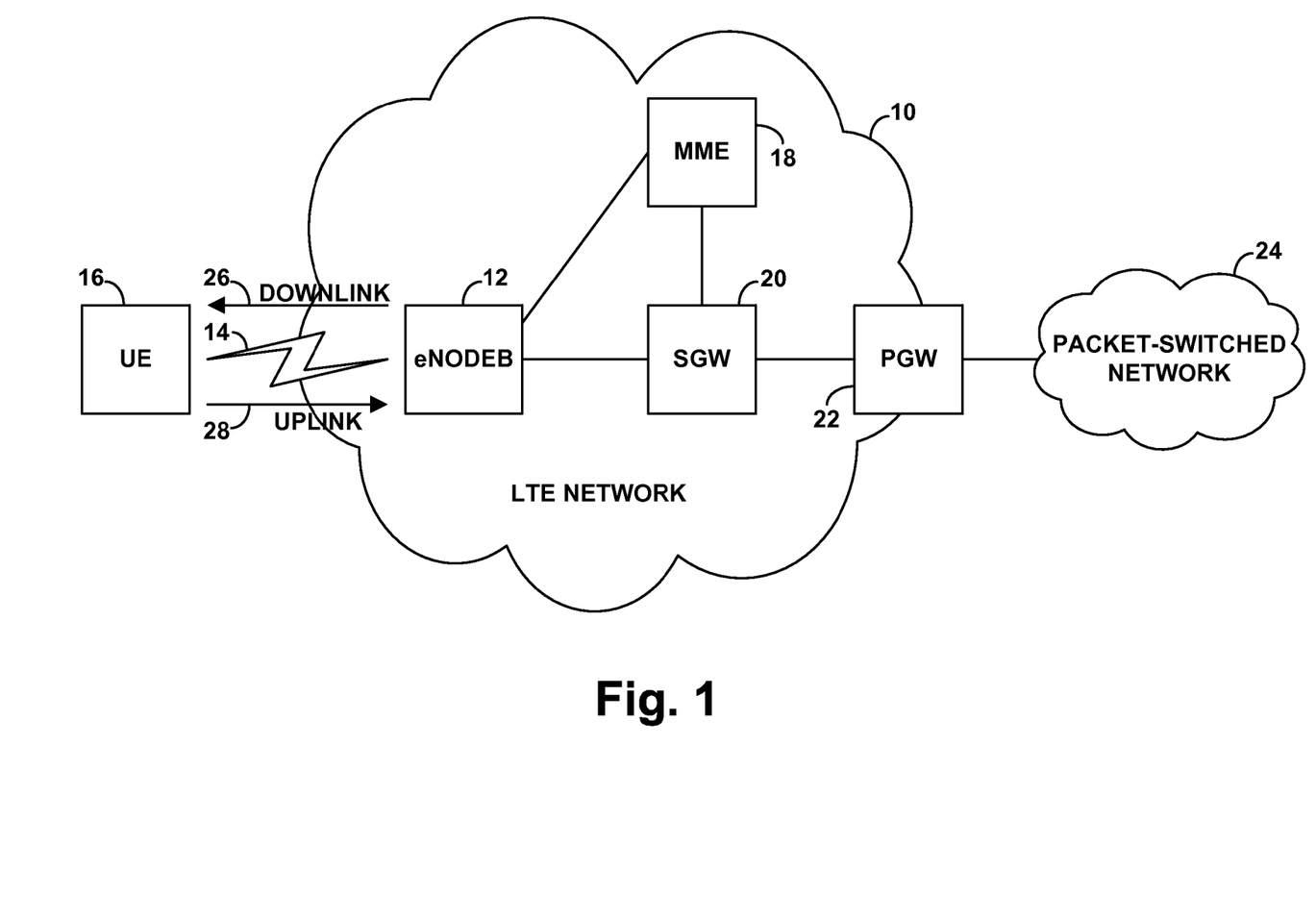
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes an eNodeB 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UEs may be configured to support air interface communication on various carriers, each having a respective downlink channel spanning a particular frequency range and a different respective uplink channel spanning a different frequency range. Each such carrier and/or its particular downlink and uplink channels may be identified by one or more globally unique identifiers per industry standard, so that the eNodeB and a served UE can refer to particular carriers by those identifiers.

The LTE air interface may then define on the downlink various sub-channels, such as a physical downlink control channel (PDCCH) for carrying scheduling directives and other control signaling from the eNodeB to UEs and a physical downlink shared channel (PDSCH) for carrying scheduled downlink data communication, and the eNodeB may further broadcast on the downlink a reference signal that UEs can monitor to evaluate coverage quality. Likewise, the air interface may define on the uplink various sub-channels, such as a physical uplink control channel (PUCCH) for carrying scheduling requests and other control signaling from the UEs to the eNodeB and a physical uplink shared channel (PUSCH) for carrying scheduled uplink data communication, and UEs may further transmit uplink reference signals that the eNodeB can monitor to help evaluate uplink coverage quality.

With this arrangement, when UE 16 enters into coverage of eNodeB 12, the UE may engage in an attach process in order to register with the LTE network, and the UE may engage in signaling with the eNodeB to establish a radio-link layer connection through which the eNodeB may serve the UE. In particular, the UE may initially transmit to the eNodeB an attach request, which the eNodeB may pass along to the MME 18, triggering a process of authenticating the UE and establishment of one or more logical bearer connections for the UE between the eNodeB and the PGW 22. Further, the eNodeB may transmit to the UE a radio resource control (RRC) connection message that denotes a radio-link layer connection between the UE and the eNodeB.

Through RRC signaling at the time of UE attachment or later, the eNodeB may specify a set of carriers on which the eNodeB will be serving the UE with carrier-aggregation service, with the set including at least a first component carrier F1 and a second component carrier F2. In practice, the first and second component carriers could be contiguous (with adjacent downlink channels and adjacent uplink channels) or non-contiguous (with non-adjacent, possibly distant downlink channels and non-adjacent, possibly distant uplink channels), and thus the carrier aggregation service could be considered contiguous or non-contiguous.

Once the UE has such an RRC connection, the eNodeB may then serve the UE in an RRC-connected mode. In that mode, as the eNodeB receives data for the UE (e.g., from network 24 via PGW 22 and SGW 20), the eNodeB may transmit to the UE on the PDCCH a scheduling directive that instructs the UE to receive the data in particular resource blocks on the PDSCH, and the eNodeB may transmit the data to the UE in those resource blocks, and the UE may receive and process the data. Further, as the UE has data to transmit to the eNodeB (e.g., for transmission via SGW 20 and PGW 22 to network 24), the UE may transmit a scheduling request on the PUCCH to the eNodeB, the eNodeB may then transmit to the UE on the PDCCH a scheduling directive that directs the UE to transmit the data in particular resource blocks on the PUSCH, and the UE may transmit the data to the eNodeB in those resource blocks.

Further, after a period of no data scheduled for transmission between the UE and the eNodeB, the eNodeB may release the UE's radio-link layer connection, and the eNodeB may then serve the UE in an RRC-idle mode. In that mode, when the eNodeB then has data to send to the UE or the UE has data to send to the eNodeB, the UE and eNodeB may again engage in RRC signaling to re-establish a radio-link layer connection, thus transitioning the UE back to the RRC-connected mode.

To help manage air interface communications between the UE and the eNodeB while the UE is served by the eNodeB, the UE may periodically establish and transmit channel quality reports to the eNodeB. In a carrier aggregation system, the UE may provide such reports separately for each of the component carriers on which the eNodeB is serving the UE, although the UE may transmit the reports together on a given on of the component carriers (typically one deemed "primary"). One such channel quality metric defined by LTE is a channel quality indication (CQI), which is a value ranging from 0 to 15 that is based on UE measurement of signal-to-noise ratio or the like and perhaps other factors, such as UE radio capability for instance. Another such channel quality metric defined by LTE is reference signal receive power (RSRP), which is the power level at which the UE receives a reference signal from the eNodeB on the carrier at issue. In practice, a UE could be arranged to provide these or other channel quality metrics to the eNodeB periodically on the PUCCH or perhaps along with scheduled PUSCH transmissions.

In addition, when a UE is operating in the RRC-connected mode, the eNodeB and a served UE may engage in power control signaling with each other to help manage power of their respective air interface transmissions to each other. For instance, each may evaluate transmission quality and power from the other and transmit to the other power-up or power-down commands to help maintain power of transmission at a level that maintains acceptable quality (e.g., acceptable error rate) while not increasing transmission power so much as to unduly interfere with other UEs' service.

Figure 2:
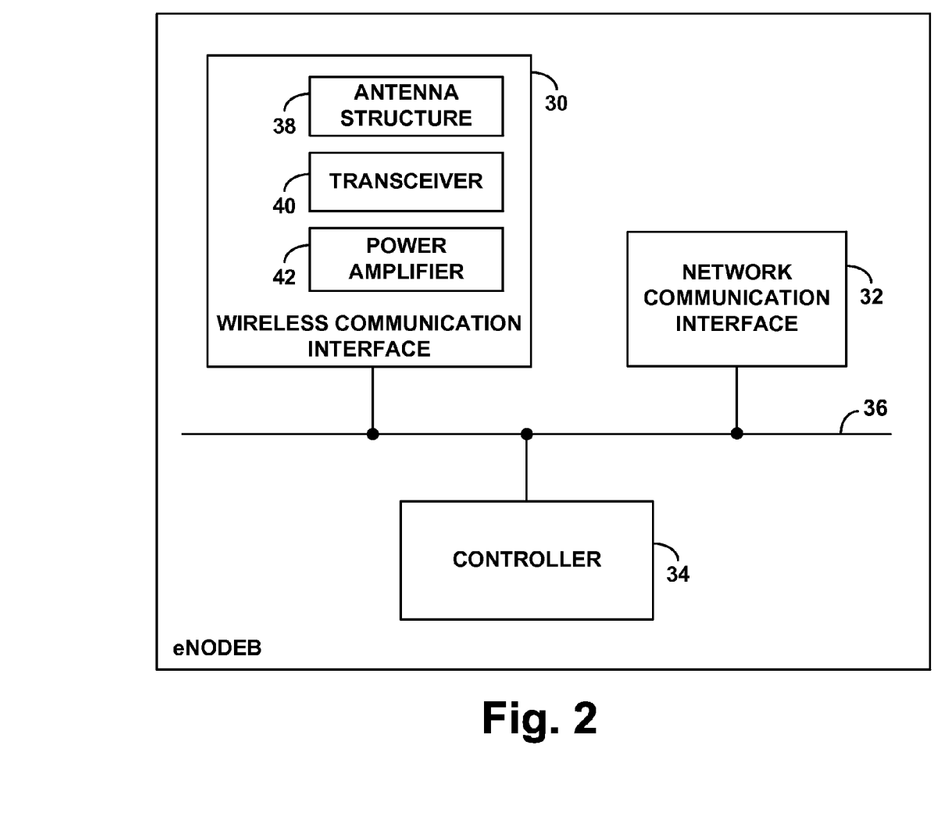
FIG. 2 is a simplified block diagram of an example base station operable in accordance with the disclosure.

FIG. 2 is next a simplified block diagram of an example eNodeB (e.g., macro base station, small cell, or other eNodeB), showing some of the components that could be included in such an entity to facilitate carrying out various base station functions described herein. As shown, the example eNodeB includes a wireless communication interface 30, a network communication interface 32, and a controller 34, all of which could be integrated together in various ways or, as shown, interconnected with each other through a system bus, network, or other connection mechanism 36.

Wireless communication interface 32 includes an antenna structure (e.g., one or more antennas or antenna elements) 38, which could be tower mounted or provided in some other manner, configured to transmit and receive over the air interface and thereby facilitate communication with served UEs. Further, the wireless communication interface includes a transceiver 40 and power amplifier 42 supporting air interface communication according to the LTE protocol. Network communication interface 34 may then comprise one or more wired and/or wireless network interfaces (such as an Ethernet interface) through which the base station may receive data over a backhaul connection that connects the base station to one or more entities of a wireless network, such as an MME and SGW as discussed above.

Controller 34, which may be integrated with wireless communication interface 32 or with one or more other components of the eNodeB, may then manage communication over the air interface, including managing assignment of component carriers in accordance with the present disclosure. By way of example, controller 34 may be configured to predict, when the eNodeB is serving UE 16 with carrier-aggregation service on a set of component carriers including first component carrier F1 and a second component carrier F2, that transmission by the UE concurrently on an uplink channel of the first component carrier and on an uplink channel of the second component carrier is likely to produce an intermodulation product that falls within a downlink channel of either the first component carrier or the second component carrier and that the intermodulation product is likely to be threshold strong in relation to a receive power of the UE on the downlink channel. And controller 34 may be configured to respond to that prediction by transitioning the eNodeB from serving the UE with carrier-aggregation service on the set of component carriers to serving the UE with carrier-aggregation service on a different set of component carriers.

Controller 34 could be implemented using hardware, software, and/or firmware. For example, controller 34 could include one or more processors and a non-transitory computer readable medium (e.g., volatile and/or non-volatile memory) that stores machine language instructions or other executable instructions. The instructions, when executed by the one or more processors, may cause controller 34, and thus the eNodeB, to carry out the various base station operations described herein.

Figure 3:
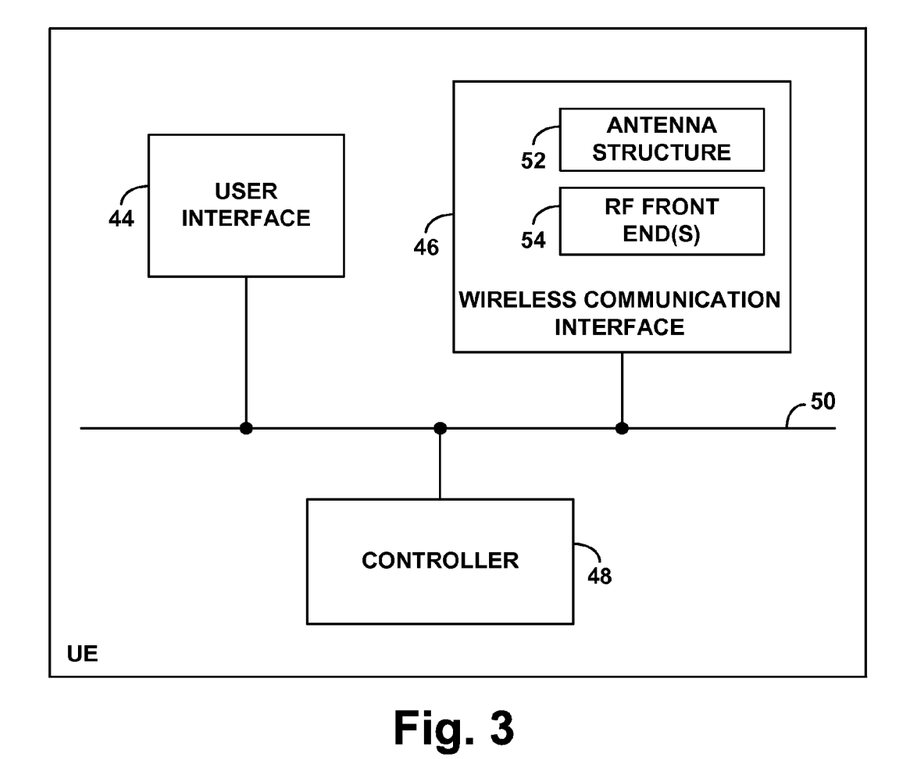
FIG. 3 is a simplified block diagram of an example UE operable in accordance with the disclosure.

FIG. 3 is next a simplified block diagram of an example UE such as UE 16, showing some of the components that may be included in such a device to facilitate carrying out various UE functions described herein. As shown, the example UE includes a user interface 44, a wireless communication interface 46, and a controller 48, all of which could be integrated together in various ways or, as shown, interconnected with each other through a system bus, network, or other connection mechanism 50.

User interface 44 may include input and output components to facilitate interaction with a user, if the UE is a user-operable device. Wireless communication interface 46 includes an antenna structure (e.g., one or more antennas or antenna elements) 52, configured to transmit and receive over the air interface and thereby facilitate communication with a serving eNodeB. Further, the wireless communication interface includes one or more radio frequency (RF) front ends 54 for interfacing between the antenna structure and one or more radios (not shown) or other components, so as to support air interface communication on various carriers. Controller 48, which may be integrated with wireless communication interface 46 or with one or more other components, may then control various UE functions.

Figure 4:
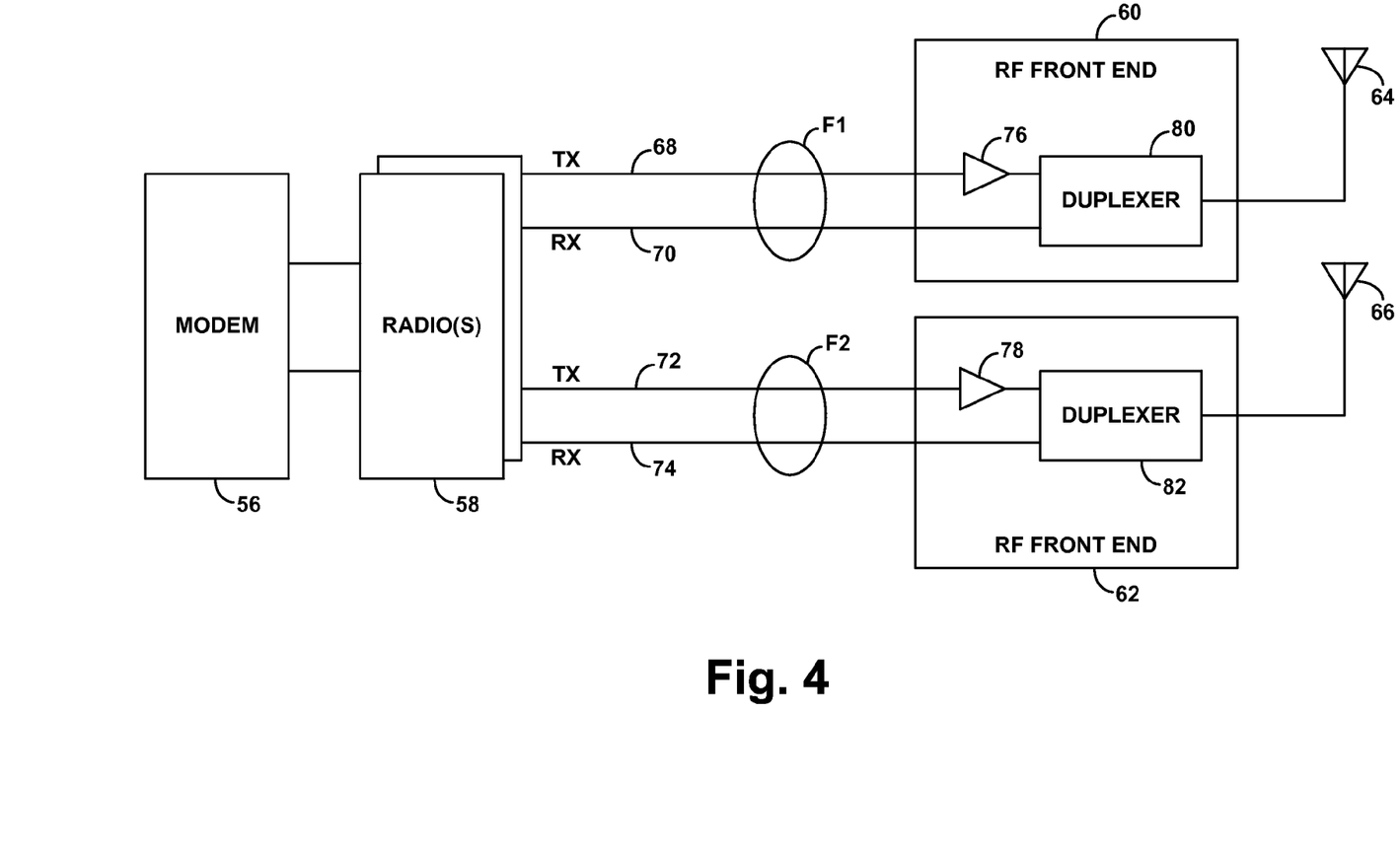
FIG. 4 is a simplified block diagram of an example UE wireless communication interface.

The one or more RF front ends 54 of the UE may comprise active components configured to support bi-directional communication via the antenna structure 52 concurrently on multiple component carriers on which the UE is being served with carrier-aggregation service. In an example wireless communication interface, the one or more RF front ends 54 would include at least two RF front ends, each supporting bi-directional communication on one or more component carriers, and each interfacing with one or more respective antennas. FIG. 4 is an illustration of this example arrangement.

As shown in FIG. 4, the example arrangement includes a modem 56 interconnected with one or more radios 58, and multiple transmit (uplink) and receive (downlink) paths extending between the one or more radios 58 and a pair of RF front ends 60, 62 that interface with respective sets of one or more antennas 64, 66. In operation, the one or more radios and RF front ends may be program-controlled to facilitate operation on designated respective component carriers. For instance, one radio and one RF front end may be set to support communication on the first component carrier F1, and another radio and other RF front end may be set to support communication on the second component carrier F2. Thus, as shown by way of example, the top pair of transmit and receive paths could be a transmit path 68 for the uplink channel of carrier F1 and a receive path 70 for the downlink channel of carrier F1, and the bottom pair of transmit and receive paths could be a transmit path 72 for the uplink channel of carrier F2 and a receive path 74 for the downlink channel of carrier F2.

In the example arrangement, each RF front end includes a respective amplifier 76, 78 for amplifying uplink communications, and a respective duplexer 80, 82 for combining and separating uplink and downlink communications. In practice, each RF front end may thus receive uplink-channel communications on its transmit path, its amplifier may amplify those uplink-channel communications, and its duplexer may pass signals representing the amplified uplink-channel communications to its set of antennas for transmission on the air interface. Further, each RF front end may receive signals from its set of antennas, apply a band-pass filter to extract the downlink channel of the applicable component carrier, and pass the resulting downlink-channel communications along its receive path for processing With this arrangement, intermodulation distortion, particularly third order intermodulation products, could arise in a duplexer or other such active component that handles communications on one component carrier, through coupling of uplink transmissions of the other component carrier. For instance, although the duplexer 80 in the top RF front end 60 should ideally be receiving uplink communications only on the uplink-channel of the first component carrier F1, uplink transmission by the other RF front end 62 and associated set of antennas 66 could couple as input to duplexer 80. Consequently, duplexer 80 may end up processing a combination of both the uplink channel of carrier F1 and the uplink channel of carrier F2, which could create an intermodulation frequency product that, depending on the frequencies at issue, may fall within the downlink channel of carrier F1. As a result the downlink communications that the duplexer passes along for processing could be distorted by the added intermodulation product. Other arrangements and sources of intermodulation distortion may be possible as well.

As noted above, such intermodulation distortion may pose a problem when the UE's uplink transmission power on the two component carriers is sufficiently high, particularly if the transmit/receive paths for the two component carriers are so close together as in a typical UE. In accordance with the present method, the eNodeB may thus dynamically monitor conditions to determine (i) whether the multiple uplink channels on which the eNodeB is serving a UE are likely to combine to produce an intermodulation product that falls within a downlink channel on which the eNodeB is serving the UE and (ii) whether the intermodulation product is likely to be threshold strong in relation to the UE's receive power on that downlink channel. Upon detecting such a situation, the eNodeB may then automatically change the set of component carriers on which the eNodeB serves the UE, so as to help avoid the associated intermodulation distortion.

To determine whether the uplink channels on which the eNodeB is serving the UE are likely to combine to produce an intermodulation product that falls within the downlink channel on which the eNodeB is serving the UE, the eNodeB may first determine the frequency of an intermodulation product (e.g., third order intermodulation product) that would result from combining the two uplink channels, and the eNodeB may then determine if that frequency falls within the range of frequency defining the downlink channel. By way of example, the eNodeB may compute the frequency $F_{IM}$ of the third order intermodulation product based on representative frequencies (e.g., center frequencies) $F_{U1}$ and $F_{U2}$ of the uplink channels, applying a formula such as $F_{IM}=2F_{U2}-F1_{U1}$, and/or $F_{IM}=2F_{U1}-F1_{U2}$. The eNodeB may then determine whether that frequency $F_{IM}$ falls with the range of frequency defining the downlink channel of either component carrier, i.e., within the range extending from the starting frequency of the downlink channel to the ending frequency of the downlink channel.

If the eNodeB determines that the computed frequency $F_{IM}$ does not fall within either downlink channel on which the eNodeB is serving the UE, then the process may end. However, if the eNodeB determines that the computed frequency $F_{IM}$ falls within at least one of the downlink channels, then the eNodeB may then further evaluate to determine whether a power level $P_{IM}$ of the likely intermodulation product would likely be threshold strong, which could indicate that the UE may experience problematic intermodulation distortion.

The eNodeB may predict a power level (or energy level) $P_{IM}$ of the intermodulation product based on information regarding the power levels at which the UE is transmitting on the two uplink channels, on grounds that the intermodulation product would be stronger as the underlying transmissions combining to produce the intermodulation product are stronger. In particular, the eNodeB may determine the UE's transmit power level $P_{TX1}$ on the uplink channel of the first component carrier, the eNodeB may determine the UE's transmit power level $P_{TX2}$ on the uplink channel of the second component carrier, and the eNodeB may then compute (predict) the power level $P_{IM}$ of the intermodulation product as a function of those two determined transmit power levels. For example, the eNodeB could compute the power level $P_{IM}$ of the intermodulation product $2F_{U2}-F1_{U1}$ as $P_{IM}=P_{TX1}-2((OIP3-P_{TX2})(CL_{F2})$, where OIP3 is a third order intermodulation product intercept point of the RF front end at issue (e.g., about 30-45 dB), and where $CL_{F2}$ is a level of coupling of carrier F2 into the RF front end handling F1 (e.g., typically 5 to 15%). As another example, the eNodeB could compute the power level $P_{IM}$ of the intermodulation product $2F_{U1}-F1_{U2}$ as $P_{IM}=(PTX2)(CL_{F2})-2(OIP3-P_{TX1})$, with the same term definitions.

In practice, the eNodeB could determine the power levels of the UE's transmissions on the uplink of each component carrier in various ways. By way of example, the eNodeB could engage in signaling with the UE to request and receive reports of the UE's transmission power on each component carrier, or the UE may autonomously report its transmission power on each component carrier, perhaps together with the UE's channel quality reports to the eNodeB.

Figure 5:
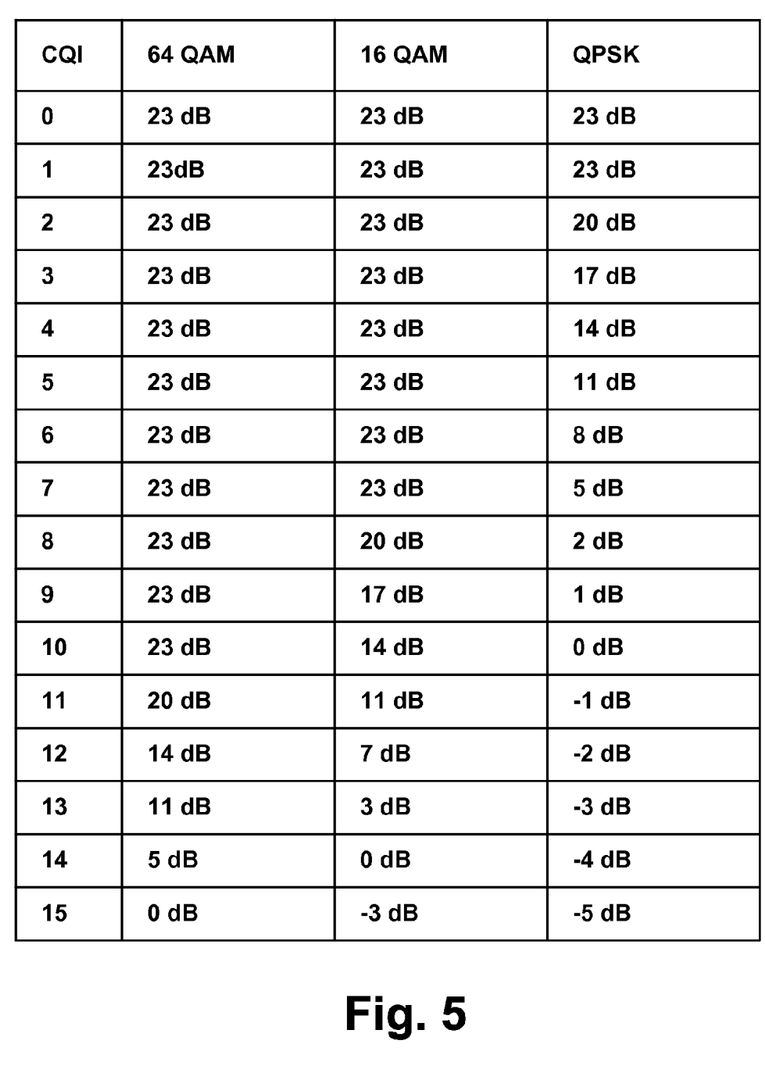
FIG. 5 is an example table mapping channel quality levels with uplink transmission power levels.

As another example, the eNodeB could determine each uplink transmit power based on a channel quality report that the UE provides respectively for each carrier, on grounds that the UE would likely be transmitting at higher power on the uplink if the UE's channel quality on the corresponding downlink is poor. In particular, the eNodeB may maintain and apply a simple mapping table that correlates particular CQI levels with likely UE transmit power levels for various modulation schemes that the eNodeB would direct the UE to use for uplink transmission. FIG. 5 is an example of such a table, specifying UE transmit power for each of various CQI levels, per modulation scheme (listing values for three example modulation schemes, 64QAM, 16QAM, and QPSK), though numerous other examples of such mapping data could be established through engineering analysis.

Still further, as another example, the eNodeB could determine each uplink transmit power by applying a more complex formula, taking into account various factors that may impact the UE's transmission power, such as the extent of resources the eNodeB has been assigning to the UE (e.g., average number of resource blocks per frame or subframe) for transmission on the uplink channel at issue, and modulation and coding scheme designated by the base station for transmission by the UE on the uplink channel at issue. Without limitation, an example of such a formula could be the lesser of (i) the UE's maximum possible transmit power (e.g., a value around 36.101 dB, defined per UE capabilities data or otherwise established) and (ii) a sum of $10 \log(M)+P_0+(\alpha)(PL)+\Delta_{MCS}+f(\Delta_i)$, where M is the number of assigned resource blocks, $P_0$ is a power adjustment value specified by the eNodeB, $\alpha$ is a path loss compensation factor specified by the eNodeB, PL is a path loss value based on comparison of the eNodeB's transmit power and the UE's reported receive power, $\Delta_{MCS}$ is a power-backoff value specified by the eNodeB per modulation and coding scheme (MCS), and $f(\Delta_i)$ is a function related to trend or extent of power-up and power-down commands, such as being higher when there have been more power-up commands and lower when there have been more power-down commands. Other examples are possible as well.

Given the predicted power level $P_{IM}$ of the intermodulation product that would fall within a downlink channel of one of the component carriers on which the eNodeB is serving the UE, the eNodeB may then determine whether that predicted power level is threshold high. This determination may be made by comparing the power level $P_{IM}$ with a predetermined threshold level deemed to represent high intermodulation product power. However, as the ultimate question is whether the intermodulation product would have a sufficient impact on downlink communications, a better process may be for the eNodeB to compute a ratio of the UE's receive power level $P_{RX}$ on the downlink channel at issue (e.g., RSRP as reported by the UE or otherwise as determined by the eNodeB) to the computed intermodulation product power level $P_{IM}$. Such a ratio essentially represents a signal to interference ratio. The eNodeB may then compare that ratio with a predefined threshold level to determine whether the ratio is threshold low, indicating that the intermodulation product power is threshold high, or not.

If, through this analysis, the eNodeB determines that intermodulation product is not likely to be threshold high, then the process may end. However, if the eNodeB determines that the intermodulation product is likely to be threshold high, then the eNodeB may responsively take action to help avoid the intermodulation product, and perhaps to avoid any such intermodulation. In particular, the eNodeB may responsively change the set of component carriers on which the eNodeB serves the UE. For instance, of the various component carriers that the eNodeB and UE support, the eNodeB may select one or more component carriers to replace one or more of the component carriers on which the eNodeB is currently serving the UE, and the eNodeB may transmit an RRC connection reconfiguration message to the UE, specifying the new set.

In practice, the eNodeB may thereby reconfigure the set of component carriers on which the eNodeB serves the UE with carrier aggregation service, so that the set no longer includes both the first component carrier and the second component carrier (but may still include one of those component carriers). Further, by applying analyses such as those discussed above, the eNodeB could select the replacement component carrier(s) based on a determination that communication on the respective uplink channels of the resulting set of component carriers on which the eNodeB would then serve the UE would not likely combine to produce an intermodulation product that falls within a downlink channel of any carrier of the set.

Figure 6:
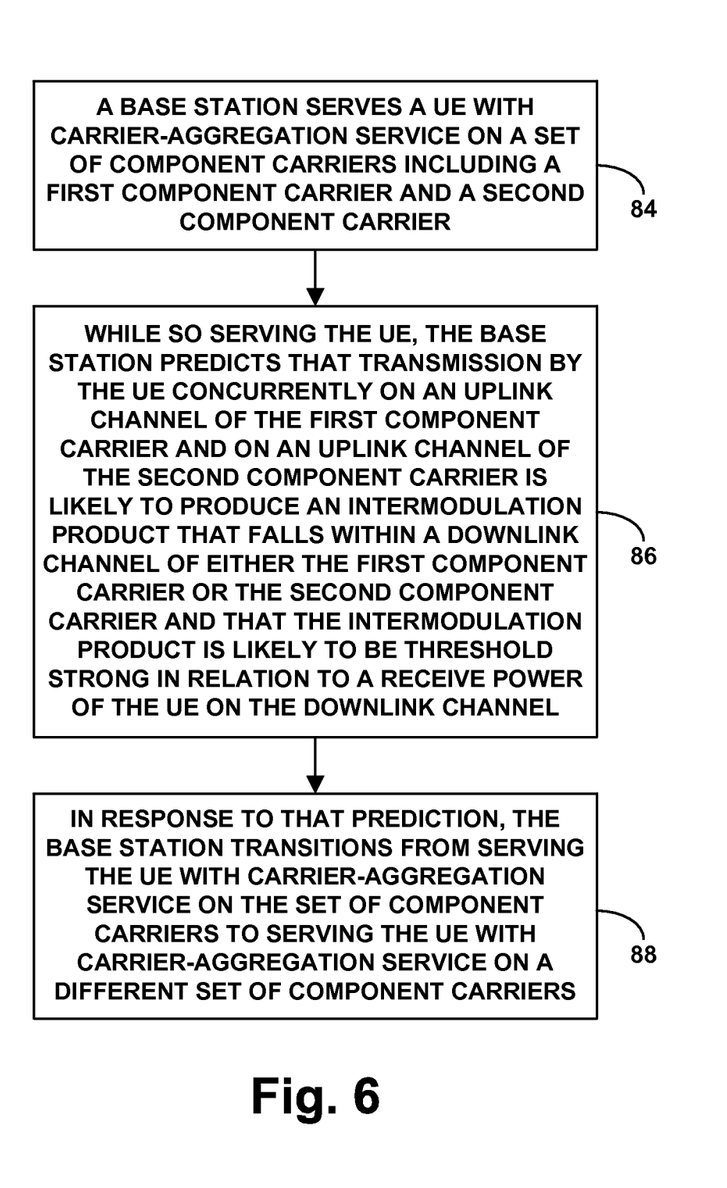
FIG. 6 is a flow chart depicting example operations in accordance with the disclosure.
Figure 7:
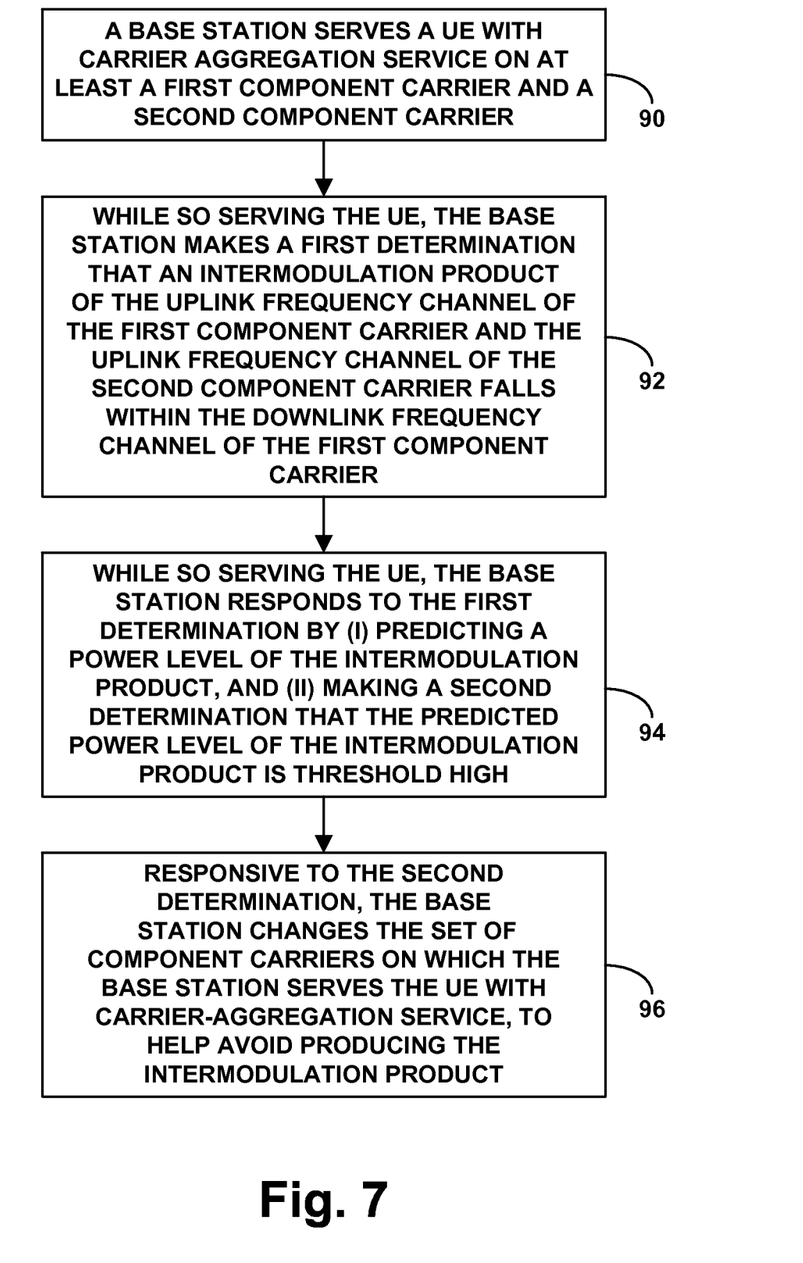
FIG. 7 is another flow chart depicting example operations in accordance with the disclosure.

FIGS. 6 and 7 are next flow charts depicting in summary some of the functions described above.

As shown in FIG. 6, at block 84, a base station serves a UE with carrier-aggregation service on a set of component carriers including a first component carrier and a second component carrier. At block 86, while so serving the UE, the base station predicts that transmission by the UE concurrently on an uplink channel of the first component carrier and on an uplink channel of the second component carrier is likely to produce an intermodulation product that falls within a downlink channel of either the first component carrier or the second component carrier and that the intermodulation product is likely to be threshold strong in relation to a receive power of the UE on the downlink channel. And at block 88, in response to that predicting, the base station transitions from serving the UE with carrier-aggregation service on the set of component carriers to serving the UE with carrier-aggregation service on a different set of component carriers.

As shown in FIG. 7, at block 90, a base station similarly serves a UE with carrier aggregation service on at least a first component carrier and a second component carrier. At block 92, while so serving the UE, the base station makes a first determination that an intermodulation product of the uplink frequency channel of the first component carrier and the uplink frequency channel of the second component carrier falls within the downlink frequency channel of the first component carrier. Further, at block 94, also while so serving the UE, the base station responds to the first determination by (i) predicting a power level $P_{IM}$ of the intermodulation product, and (ii) making a second determination that the predicted power level $P_{IM}$ of the intermodulation product is threshold high. At block 96, responsive to the second determination, the base station then changes the set of component carriers on which the base station serves the UE with carrier-aggregation service, to help avoid producing the intermodulation product.

Exemplary embodiments have been described above. Those skilled in the art will understand, however, that changes and modifications may be made to these embodiments without departing from the true scope and spirit of the invention.

We claim:

1. A method comprising:
    serving, by a base station, a user equipment device (UE) with carrier-aggregation service on a set of component carriers including a first component carrier and a second component carrier, wherein the component carriers of the set each have a respective uplink channel and a different respective downlink channel;
    while serving the UE, predicting by the base station that transmission by the UE concurrently on the uplink channel of the first component carrier and on the uplink channel of the second component carrier will produce an intermodulation product that will fall within the downlink channel of the first component carrier and that the intermodulation product will be threshold strong in relation to a receive power of the UE on the downlink channel of the first component carrier; and
    responsive to the predicting, transitioning by the base station from serving the UE with carrier-aggregation service on the set of component carriers to serving the UE with carrier-aggregation service on a different set of component carriers, wherein the different set of component carriers does not include at least the second component carrier, and wherein component carriers of the different set each have a respective uplink channel and a different respective downlink channel.

2. The method of claim 1, wherein the different set of component carriers does not include the first component carrier and does not include the second component carrier.

3. A method of managing component carriers on which a base station serves a user equipment device (UE) with carrier-aggregation service, wherein the base station initially serves the UE on a set of component carriers comprising a first component carrier and a second component carrier, each component carrier of the set having a respective uplink frequency channel and a different respective downlink frequency channel, the method comprising:
    making a first determination by the base station that an intermodulation product of the uplink frequency channel of the first component carrier and the uplink frequency channel of the second component carrier falls within the downlink frequency channel of the first component carrier;
    responsive to the first determination, (i) predicting by the base station a power level $P_{IM}$ of the intermodulation product, and (ii) making a second determination by the base station that the predicted power level $P_{IM}$ of the intermodulation product is threshold high; and
    responsive to the second determination, changing the set of component carriers on which the base station serves the UE with carrier-aggregation service, to help avoid producing the intermodulation product,
    wherein changing the set of component carriers on which the base station serves the UE with carrier-aggregation service comprises replacing at least the second component carrier, so that the set of component carriers no longer includes at least the second component carrier.

4. The method of claim 3, wherein making the first determination comprises:
    computing a frequency $F_{IM}$ of the intermodulation product as a function of (i) a first frequency $F_{U1}$ representative of the uplink frequency channel of the first component carrier and (ii) a second frequency $F_{U2}$ representative of the uplink frequency channel of the second component carrier; and determining that the computed frequency $F_{IM}$ falls within the downlink frequency channel of the first component carrier.

5. The method of claim 4,
wherein $F_{U1}$ is a representative center frequency of the uplink frequency channel of the first component carrier, and
wherein $F_{U2}$ is a representative center frequency of the uplink frequency channel of the second component carrier.

6. The method of claim 4, wherein the function comprises a computation selected from the group consisting of (i) $2F_{U2}-F_{U1}$ and (ii) $2F_{U1}-F_{U2}$.

7. The method of claim 6, wherein the downlink frequency channel of the first component carrier extends from a starting frequency to an ending frequency, and wherein determining that the computed frequency $F_{IM}$ falls within the downlink frequency channel of the first component carrier comprises determining whether $F_{IM}$ falls within a range from the starting frequency to the ending frequency.

8. The method of claim 3, wherein predicting the power level $P_{IM}$ of the intermodulation product is based at least in part on a transmit power level $P_{TX1}$ of the UE on the uplink frequency channel of the first component carrier and a transmit power level $P_{TX2}$ of the UE on the uplink frequency channel of the second component carrier.

9. The method of claim 8, wherein predicting the power level $P_{IM}$ of the intermodulation product comprises:
determining the transmit power level $P_{TX1}$ of the UE on the uplink frequency channel of the first component carrier;
determining the transmit power level $P_{TX2}$ of the UE on the uplink frequency channel of the second component carrier; and
predicting the power level $P_{IM}$ of the intermodulation product as a function of at least the determined transmit power levels $P_{TX1}$ and $P_{TX2}$.

10. The method of claim 9,
wherein determining the transmit power level $P_{TX1}$ of the UE on the uplink frequency channel of the first component carrier comprises determining the transmit power level $P_{TX1}$ based at least in part on a report from the UE of quality of the downlink frequency channel of the first component carrier, and
wherein determining the transmit power level $P_{TX2}$ of the UE on the uplink frequency channel of the second component carrier comprises determining the transmit power level $P_{TX2}$ based at least in part on a report from the UE of quality of the downlink frequency channel of the second component carrier.

11. The method claim 9,
wherein determining the transmit power level $P_{TX1}$ of the UE on the uplink frequency channel of the first component carrier comprises computing the transmit power level $P_{TX1}$ as a function of at least (i) extent of resources assigned by the base station to the UE on the uplink frequency channel of the first component carrier and (ii) modulation and coding scheme designated by the base station for transmission by the UE on the uplink frequency channel of the first component carrier, and
wherein determining the transmit power level $P_{TX2}$ of the UE on the uplink frequency channel of the second component carrier comprises computing the transmit power level $P_{TX2}$ as a function of at least (i) extent of resources assigned by the base station to the UE on the uplink frequency channel of the second component carrier and (ii) modulation and coding scheme designated by the base station for transmission by the UE on the uplink frequency channel of the second component carrier.

12. The method of claim 3, wherein making the second determination that the predicted power level $P_{IM}$ of the intermodulation product is threshold high comprises determining that the predicted power level $P_{IM}$ of the intermodulation product is threshold high compared with a receive power level $P_{RX}$ of the UE on the downlink frequency channel of the first component carrier.

13. The method of claim 12, wherein determining that the predicted power level $P_{IM}$ of the intermodulation product is threshold high compared with a receive power level $P_{RX}$ of the UE on the downlink frequency channel of the first component carrier comprises:
receiving from the UE a report of the receive power level $P_{RX}$;
computing a ratio of the receive power level $P_{RX}$ to the predicted power level $P_{IM}$; and
determining that the computed ratio is lower than a predefined threshold level.

14. The method of claim 3, wherein changing the set of component carriers on which the base station serves the UE with carrier-aggregation service, to help avoid producing the intermodulation product, comprises:
reconfiguring the set of component carriers so that the set of component carriers no longer includes the first component carrier and no longer includes the second component carrier.

15. The method of claim 14, wherein changing the set of component carriers on which the base station serves the UE with carrier-aggregation service comprises:
selecting a new set of component carriers on which to serve the UE with carrier-aggregation service, wherein the selecting is based at least in part on a prediction that concurrent uplink transmission on multiple component carriers of the new set would not combine to produce an intermodulation product that falls within a downlink channel of any component carrier of the new set.

16. The method of claim 14, reconfiguring the set of component carriers comprises transmitting to the UE a reconfiguration message designating the component carriers of the reconfigured set.

17. The method of claim 3, wherein serving the UE with carrier-aggregation service comprises serving the UE with carrier-aggregation service in accordance with an orthogonal frequency division multiple access (OFDMA) air interface protocol.

18. A Long Term Evolution (LTE) evolved Node B (eNodeB) configured to serve user equipment devices (UEs) with carrier-aggregation service over an air interface, the eNodeB comprising:
an antenna structure for transmitting and receiving over the air interface;
a controller for managing communication over the air interface, including managing assignment of component carriers on which to serve UEs with carrier-aggregation service,
wherein the controller is configured to predict, when the eNodeB is serving a UE with carrier-aggregation service on a set of component carriers including a first component carrier and a second component carrier, that transmission by the UE concurrently on an uplink channel of the first component carrier and on an uplink channel of the second component carrier will produce an intermodulation product that falls within a downlink channel of first component carrier and that the intermodulation product will be threshold strong in relation to a receive power of the UE on the downlink channel of the first component carrier, and wherein the controller is configured to respond to the predicting by transitioning the eNodeB from serving the UE with carrier-aggregation service on the set of component carriers to serving the UE with carrier-aggregation service on a different set of component carriers, wherein the different set of component carriers does not include at least the second component carrier, and wherein the component carriers of the different set each have a respective uplink channel and a different respective downlink channel.

19. The eNodeB of claim 18, wherein the predicting comprises:

computing a frequency of the intermodulation product, based at least in part on an uplink frequency of the first component carrier and an uplink frequency of the second component carrier, and determining that the computed frequency of the intermodulation product falls within a defined frequency range of the downlink channel; and responsive to the determining, (i) computing a power level of the intermodulation product based at least in part on transmit power of the UE on the uplink channel of the first component carrier and transmit power of the UE on the uplink channel of the second component carrier, (ii) computing a ratio of the receive power of the UE on the downlink channel to the computed power level of the intermodulation product, and (iii) determining that the computed ratio is less than a predefined threshold.

20. The eNodeB of claim 18, wherein transitioning the eNodeB from serving the UE with carrier-aggregation service on the set of component carriers to serving the UE with carrier-aggregation service on the different set of component carriers comprises causing the eNodeB to transmit to the UE a Radio Resource Control (RRC) Reconfiguration message that specifies the different set of component carriers.

21. The eNodeB of claim 18, wherein the controller is configured to select the different set of component carriers based at least in part on a prediction that concurrent uplink transmission on multiple component carriers of the different set would not combine to produce an intermodulation product that falls within a downlink channel of any component carrier of the different set.

22. The eNodeB of claim 18, wherein the different set of component carriers does not include the first component carrier and does not include the second component carrier.

* * * * *